(12) United States Patent
Suffner

(10) Patent No.: US 10,214,442 B2
(45) Date of Patent: Feb. 26, 2019

(54) VITREOUS OR AT LEAST PARTLY CRYSTALLISED SEALING MATERIAL, JOINT CONNECTION, BARRIER LAYER, AND LAYER SYSTEM COMPRISING THE SEALING MATERIAL AND INTEGRATION THEREOF INTO COMPONENTS

(71) Applicant: SCHOTT AG, Mainz (DE)

(72) Inventor: Jens Suffner, Landshut (DE)

(73) Assignee: SCHOTT AG, Mainz (DE)

( * ) Notice: Subject to any disclaimer, the term of this patent is extended or adjusted under 35 U.S.C. 154(b) by 185 days.

(21) Appl. No.: 15/136,244

(22) Filed: Apr. 22, 2016

(65) Prior Publication Data
US 2016/0311720 A1 Oct. 27, 2016

(30) Foreign Application Priority Data
Apr. 22, 2015 (DE) .................. 10 2015 207 285

(51) Int. Cl.
*C03C 8/14* (2006.01)
*C03C 8/02* (2006.01)
(Continued)

(52) U.S. Cl.
CPC ............... *C03C 8/14* (2013.01); *C03C 3/064* (2013.01); *C03C 3/068* (2013.01); *C03C 3/095* (2013.01); *C03C 8/02* (2013.01); *C03C 8/24* (2013.01); *C03C 10/0054* (2013.01); *C04B 37/005* (2013.01); *C04B 37/025* (2013.01); *C04B 2237/10* (2013.01); *C04B 2237/343* (2013.01); *C04B 2237/348* (2013.01);
(Continued)

(58) Field of Classification Search
None
See application file for complete search history.

(56) References Cited

U.S. PATENT DOCUMENTS 4,268,313 A * 5/1981 Park .................. C03C 3/064
501/15
6,165,632 A * 12/2000 Blum .................. C03C 3/091
429/452
(Continued)

FOREIGN PATENT DOCUMENTS

DE 19857057 4/2000
DE 102005002435 7/2006
(Continued)

OTHER PUBLICATIONS

Yang et al, "Chemical interactions of barium-calcium-aluminosilicate-based sealing glasses with oxidation resistant alloys", Elsevier, Solid State Ionics, 160 , 2003, pp. 213-225.

*Primary Examiner* — John J Figueroa
(74) *Attorney, Agent, or Firm* — Ohlandt, Greeley, Ruggiero & Perle, L.L.P.

(57) ABSTRACT

Vitreous or at least partly crystallized sealing material is provided. The sealing material is from the system $SiO_2$—$B_2O_3$—CaO—MgO, which is free from BaO and/or SrO and which has an improved coefficient of thermal expansion and improved crystallization properties. The sealing material is employed to produce joint connections, electrical feedthroughs, and/or as a barrier layer.

16 Claims, 3 Drawing Sheets

(51) Int. Cl.
 *C03C 3/064* (2006.01)
 *C03C 3/068* (2006.01)
 *C03C 3/095* (2006.01)
 *C03C 8/24* (2006.01)
 *C03C 10/00* (2006.01)
 *C04B 37/00* (2006.01)
 *C04B 37/02* (2006.01)

(52) U.S. Cl.
 CPC .. *C04B 2237/403* (2013.01); *C04B 2237/405* (2013.01); *C04B 2237/406* (2013.01)

(56) References Cited

U.S. PATENT DOCUMENTS

| | | | |
|---|---|---|---|
| 6,532,769 | B1 | 3/2003 | Meinhardt et al. |
| 6,656,625 | B1* | 12/2003 | Thompson ............... B32B 18/00 156/89.12 |
| 7,214,441 | B2 | 5/2007 | Cortright et al. |
| 7,832,737 | B2* | 11/2010 | Chou ..................... C04B 37/04 277/652 |
| 8,178,453 | B2 | 5/2012 | Tanida et al. |
| 8,741,792 | B2 | 6/2014 | Akamatsu et al. |
| 2007/0170839 | A1* | 7/2007 | Choi ......................... C03C 8/24 313/500 |
| 2009/0197135 | A1* | 8/2009 | Querel ................. H01M 8/0282 429/460 |
| 2009/0318278 | A1 | 12/2009 | Mayumi et al. |
| 2012/0316052 | A1* | 12/2012 | Akamatsu ................. C03C 8/02 501/15 |
| 2013/0272774 | A1* | 10/2013 | Goedeke ................. C03C 3/089 403/29 |
| 2014/0221190 | A1 | 8/2014 | Takayama |
| 2014/0356046 | A1* | 12/2014 | Suffner ..................... C03C 8/24 403/28 |

FOREIGN PATENT DOCUMENTS

| | | |
|---|---|---|
| DE | 60025364 | 8/2006 |
| DE | 102012206266 | 7/2013 |
| JP | 2007161569 | 6/2007 |
| JP | 2011044319 | 3/2011 |
| WO | 01/09059 | 2/2001 |
| WO | 2011/105519 | 9/2011 |

* cited by examiner

VITREOUS OR AT LEAST PARTLY CRYSTALLISED SEALING MATERIAL, JOINT CONNECTION, BARRIER LAYER, AND LAYER SYSTEM COMPRISING THE SEALING MATERIAL AND INTEGRATION THEREOF INTO COMPONENTS

CROSS REFERENCE TO RELATED APPLICATIONS

This application claims benefit under 35 U.S.C. § 119(a) of German Patent Application No. 10 2015 207 285.1 filed Apr. 22, 2015, the entire contents of which are incorporated herein by reference.

STATEMENT REGARDING FEDERALLY SPONSORED RESEARCH OR DEVELOPMENT

Some of the works on which this invention is based have been supported by the European Community under the programme and title "Seventh Framework Programme (FP7/2007-2013) for the Fuel Cells and Hydrogen Joint Technology Initiative under grant agreement number [621207]".

BACKGROUND OF THE INVENTION

1. Field of the Invention

The present invention relates to vitreous or at least partly crystallised sealing materials which are suitable for joining metals and/or ceramics and which can be employed as a preferably standardised material in many fields of use, for example in high temperature fuel cells or electrolysis cells. The invention equally relates to barrier layers with the sealing material, layer systems, joint connections and further advantageous uses.

2. Description of Related Art

In the context of the invention sealing materials are understood to comprise materials which, when originating from a glass material, can be present in an amorphous, partly crystalline and/or crystalline form. According, and depending on the proportion of the crystallised parts, these materials can typically be referred to as vitreous or glass-ceramic materials, or more generally as glass-based materials. Sealing materials are characterised in that, during their use, they are processed by heating and subsequent cooling, which in particular allows for the establishment of joints with other components, but also of barrier layers, such as, in particular, protective layers on components and/or glass materials. Upon heating, preferably, the sealing materials can fuse with the other components, and/or sinter together with these. It is equally possible for the sealing materials to form layers on components and/or component regions, which may act, for example, as barrier layers. It is also possible for the sealing materials to be employed as glass solders, but also as preforms, pressed parts etc.

Vitreous or at least partly crystalline sealing materials are conventionally employed for establishing joint connections, in particular, in order to join glass and/or ceramic components to one another or to components of metal in an electrically insulating manner. During development of glass-based sealing materials the composition thereof is often selected such that the coefficient of thermal expansion of the sealing materials corresponds approximately to that of the components to be joined to one another, such that a joint connection which is stable in the long term can be obtained. Compared with other joint connections, for example those of plastic, the inorganic glass-based sealing materials described herein have the advantage that they can be configured to produce a hermetic seal and can withstand relatively high temperatures.

In general, the sealing materials described herein are often produced from a glass powder, which is melted during the subsequent processing steps, for example during the joining operation and/or coating operation, and which, due to the influence of heat produce the joint connection with the components to be joined. Generally, the joining temperature is selected at about the level of the so-called spherical temperature of the glass. Measurement of the spherical temperature is a standard measurement method known to the person skilled in the art and can be carried out with a heated stage microscope. If a crystallisation-free glass sealing material in the form of a glass powder is melted and cooled again so that it solidifies, it can conventionally also be melted again at the same melting temperature. For a joint connection with a sealing material in the amorphous state this means that the operating temperature to which the joint can be exposed in the long term must not be higher than the joining temperature. In fact, for many uses the operating temperature must still be significantly below the joining temperature, conventionally below the glass transition temperature $T_g$, since the viscosity of the joint material decreases at increasing temperatures and a glass which to a certain extent is flowable can be pressed out of the joint connection at high temperatures and/or pressures, so that this can fail during its service. For this reason, for high temperature uses glass-based sealing materials must conventionally have a joining temperature which is still significantly above the later operating temperature.

In order to increase the possible operating temperatures, glass-based materials are often used as a joint partner where an at least largely amorphous sealing material, the so-called base glass, at least partly or also completely crystallises in the sealing operation. The crystalline phases or the ceramics generally have properties which deviate significantly from the amorphous sealing material, e.g. with respect to the thermal expansion or the glass transition temperatures, so that the overall system of amorphous glass phase and crystalline phases can likewise have different properties to the amorphous sealing material by itself. In particular, the temperature required for remelting of glass-ceramic sealing materials can be significantly above that of the amorphous sealing material. Whether an amorphous sealing material or an at least partly crystallised sealing material is formed from an amorphous sealing material during the joining operation depends to a great degree, given a suitable composition of the sealing material, on the process procedure during the sealing-in operation, in particular on the heating and cooling curves. It is desirable for the course of the crystallisation to be controllable, which is also achieved by the suitable choice of the composition of the starting material. In the context of the present invention the term vitreous or at least partly crystallised sealing material includes both the original sealing material. i.e. the base glass, and the system formed therefrom after its use, regardless of whether it is amorphous, partly crystalline and/or completely crystallised. The term "at least partly crystallised" thus of course equally includes completely crystallised materials.

Joint connections in high temperature fuel cells, which can be employed e.g. for decentralised energy supply, are, e.g., a field of use of sealing materials having a high melting temperature. The so-called solid oxide fuel cells (SOFC), which can have very high operating temperatures of up to about 1,100° C., are, for example, an important fuel cell type. In this context the joint connection with the sealing material is conventionally used for producing fuel cell stacks, e.g. for joining several individual fuel cells to form a stack. Such fuel cells are already known and are being continuously improved. In particular, the trend in current fuel cell development is in general towards lower operating temperatures. Some fuel cells already achieve operating temperatures below 800° C., so that a lowering of the joining temperatures is possible and, due to the exposure of the SOFC components to lower temperatures during the joining operation, is also desirable.

Electrolysis cells, in particular solid oxide electrolysis cells (SOEC), which can be employed for producing chemical elements and/or compounds and can play a role, for example, in the storage and/or conversion of renewably produced energy, are similar in construction to fuel cells. These are likewise a preferred field of use of the sealing materials according to the invention.

In the fuel cell stacks or electrolysis cells described, there is therefore also to be found a layer system having the layer sequence metal component/sealing material/metal component, which can recur as often as desired.

Barrier layers on metal and/or ceramics are a further field of use of the sealing materials described herein. The sealing material can prevent the diffusion of constituents out of the metal and/or the ceramic into the environment and/or further components, for example the diffusion of chromium ions out of chromium-containing steels or nickel out of nickel-containing steels, and also the attack of substances and/or compounds originating from the environment on the metal and/or the ceramic.

Any components, e.g. feedthroughs, sensors and/or actuators, which are exposed to high temperatures, are a further field of use of the sealing materials described herein. Examples of use are to be found in the exhaust tract of an energy production unit or in the combustion chamber itself. The energy production unit can be, for example, a combustion engine, an aircraft turbine, a gas turbine etc. The sealing materials in this context are often employed in formation of the housing of these sensors and/or actuators, for example in order to join housing parts to one another or to realise electrical feedthroughs through the housing. In these uses operating temperatures of above 800° C., even above 1,000° C., are often exceeded. Uses in the field of solar energy production, e.g. in solar furnaces, or for feedthroughs in particularly critical regions, e.g. nuclear power stations, fusion power stations etc., are equally possible.

Still higher operating temperatures of above 1,000° C. are required for components in which individual components made of ceramics must be joined together.

In addition to the possible operating temperature of vitreous or at least partly crystallised sealing materials, in particular their chemical properties and their coefficient of thermal expansion are decisive criteria which qualify the sealing material for the intended uses. The chemical properties of the sealing material should in particular be compatible at the operating temperature with the material which is joined by the sealing material, and likewise with the environment to which components produced therewith are exposed. For example, vitreous or glass-ceramic sealing materials should often be so resistant to chemicals that they can withstand the substances and/or substance mixtures and further reaction products employed or formed in fuel cells or electrolysis units or sensors and/or actuators and/or feedthroughs in the long term.

Vitreous or at least partly crystallised sealing materials as such are known from numerous publications. However, few are suitable for high temperature uses.

DE 600 25 364 T2 describes a glass-ceramic joint material which comprises the system $BaO—SrO—CaO—MgO—Al_2O_3—SiO_2$. Glass-ceramic compositions which contain at least 20 mol % of BaO and up to 20 mol % of $B_2O_3$ are disclosed.

DE 10 2005 002 435 A1 relates to glass-ceramics as a joint material for high temperature uses. The material system likewise allows significant amounts of BaO and comprises at least 15 wt % of $B_2O_3$. No information is given about the physical properties.

U.S. Pat. No. 6,532,769 B1 describes joining with a glass which comprises at least 20 mol % of BaO.

US 2014/0221190 A1 describes crystallising glass materials for joining fuel cells, which necessarily comprise BaO, because otherwise the glass systems described there demix on melting.

US 2009/0318278 A1 describes joint materials for fuel cells, which comprise BaO-containing and BaO-free systems. After conversion into mol %, the BaO-free systems have relatively low proportions of $SiO_2$ and relatively high proportions of $B_2O_3$.

U.S. Pat. No. 8,178,453 B2 discloses BaO- and SrO-containing and BaO- and SrO-free glass systems for joining fuel cells, in which the content of MgO is limited to 8-25 mol % because according to the opinion expressed there the glass material otherwise becomes unstable.

All these sealing materials have the common feature that they can comprise noticeable amounts of BaO. BaO is popularly used as a constituent of such materials in order to establish the desirable high coefficients of thermal expansion. In addition to the glass-forming agent $SiO_2$, BaO therefore becomes a main component of the sealing material. On the other hand, no attention is paid to the chemical properties of these materials. This was also of relatively little importance hitherto, since precisely in the field of fuel cells cost-intensive special steels or other cost-intensive materials have been used in construction. The very high barium content in the publications has an adverse effect on the chemical resistance. Thus, for example, it is possible that such sealing materials have interactions with their joint partners and/or operating substances and/or with substances to be found in the environment, such as acids and/or alkalis and/or water, which may attack the sealing material and in this way reduce the life of the component.

BaO-free sealing materials are known from U.S. Pat. No. 7,214,441, B2. Instead of this, the description provides for SrO in amounts of at least 10 to 25 mol %. The embodiment examples have a minimum content of SrO of 18 mol %, or the only examples containing no SrO comprise $B_2O_3$ as the glass-forming agent in large amounts of more than 40 mol %. High contents of $B_2O_3$ worsen the chemical resistance of the glasses significantly, so that they cannot be used in the long term in the environments typical of high temperature uses in which aggressive media and/or aggressive substances conventionally occur. The glasses described above are also of little suitability in uses where very high water vapour pressures are present at high temperatures because of the pronounced tendency to form volatile $B(OH)_3$ compounds. Due to the high content of SrO, furthermore, a poor chemical resistance is also observed in contact with chromium-containing alloys. It has been found for these and the SrO-containing variants that no joint connections which are stable in the long term can be established with them.

DE 10 2012 206 266 B3 relates to BaO- and SrO-free joint materials in particular for producing fuel cells, which are matched in particular to chromium-based alloys, such as e.g. CFY, with respect to the coefficients of thermal expansion and the chemical properties. This material shows crystallisation properties which are easy to control, nevertheless over quite long process times. In order to reduce the outlay on production and therefore also the production costs of the overall systems, there is a desire to employ materials and/or systems which are less complex to produce and which in particular are based on standard materials or at least less cost-intensive materials. In particular, one aim is to be able to use chromium-containing or nickel-containing materials, in particular chromium-containing and/or nickel-containing steels, such as, for example, ferritic chromium steel. An example of such a steel is Crofer 22 APU from ThyssenKrupp. Crofer 22 APU is a special steel which has been developed for use in high temperature fuel cells. Furthermore, other commercial ferritic steel alloys, such as e.g. AISI 441 (1.4509), AISI 442 (1.4742) or ZMG232L (Hitachi), can also, but not exclusively, be used. Nickel alloys, in particular chromium-containing nickel alloys, can also be used. Such alloys are known, inter alia, under the brand names Inconel and Hastelloy. From these, particular challenges result for the sealing materials if these come into contact with these materials during component production and/or operation thereof, since all BaO- and/or SrO-containing sealing materials have the disadvantage that they undergo interfacial reactions with chromium and therefore have only little utility and a low adhesive strength on chromium-containing materials. As a result, their thermal cyclability is likewise adversely influenced. This has the consequence that joints with materials of high chromium content, such as chromium steels or chromium-nickel steels with high chromium contents, and these glasses are unstable, i.e. the glass layer easily splits off from the materials of high chromium content. Nickel steels and/or chromium-nickel steels and/or nickel alloys can have equally adverse effects on the glass if nickel diffuses out of the metal in the direction of the glass and, as it were, poisons this.

SUMMARY

Against the background of these statements, the invention is based on the object of providing a vitreous or at least partly crystallised sealing material which is free from BaO and SrO and which renders possible joints which are stable in the long term, such as, for example, joint connections of chromium-containing and/or nickel-containing materials, such as chromium-containing steels or chromium alloys and/or nickel-containing steels and/or chromium-nickel steels or nickel alloys and the sealing material. It is equally an object of the invention that the sealing material can be employed for producing components with a reduced outlay on production. This manifests itself in particular in a reduced crystallisation time. Both criteria should preferably be met at the same time.

All the percentage data mentioned in the following are data in mol %, based on oxide, unless stated otherwise.

According to the invention, the vitreous or at least partly crystallised sealing material is free from BaO and SrO apart from at most impurities. Free apart from at most impurities means that BaO and SrO are not intentionally admixed to the starting material. However, it is occasionally unavoidable or unacceptable with respect to outlay that contamination with these components caused by natural distribution of these substances in the desired components or by the processing in the glass production can be avoided completely. It may therefore be that small amounts of BaO and/or SrO are present in the sealing material according to the invention because of these impurities. Preferably, however, the total content of BaO and SrO does not exceed 0.2 mol %.

The reason for the problematic behaviour of BaO-containing sealing materials is to be seen in the fact that barium chromate phases, which can weaken the joint, form at the interface between the sealing material and the chromium-containing material coming into contact therewith. According to Yang et al. [Solid State Ionics 160 (2003); 213-235], the interfacial reaction:

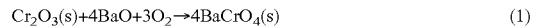

$$Cr_2O_3(s)+4BaO+3O_2 \rightarrow 4BaCrO_4(s) \qquad (1)$$

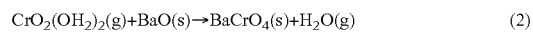

$$CrO_2(OH_2)_2(g)+BaO(s) \rightarrow BaCrO_4(s)+H_2O(g) \qquad (2)$$

occurs.

Reaction (1) takes place via diffusion at the interface, while in reaction (2) gaseous chromium oxide reacts with the BaO.

The reaction products during operation in particular of a fuel cell, inter alia water vapour, can cause large pores at the interface of the chromium-containing material and the joint material. These pores can be the starting point for defects.

Due to the different coefficients of thermal expansion of the barium chromate phase and the chromium-containing material, e.g. CFY from Plansee, delamination of the sealing material from the metal surface often occurs.

The reaction of the vitreous or glass-ceramic sealing material with the chromium from the chromium-containing material also often manifests itself in a yellowish discoloration of the BaO-containing sealing material, which is chiefly attributable to the barium chromate ($BaCrO_4$) which forms. Due to the formation of the barium chromate phase the sealing material becomes greatly depleted in barium, as a result of which an intensified crystallisation is induced.

It has also been found that on contact with materials of high chromium content, equally like BaO, SrO shows undesirable interfacial reactions, which can lead to undesirable interfacial phases. The strontium chromate formed likewise has a coefficient of thermal expansion which differs greatly from the vitreous or glass-ceramic joint material, and for this reason unstable joint connections may result on the basis of the mechanisms described. According to the invention, the sealing materials are therefore equally free from SrO apart from at most impurities.

The vitreous or at least partly crystalline sealing material according to the invention comprises from 25% up to 45% of $SiO_2$. At higher contents the coefficient of thermal expansion may become too low to be able to enter into a joint on metals in the long term, and at lower contents the chemical resistance may decrease to an undesirable extent and the tendency towards crystallisation may increase. Preferred ranges are from 25% to <35%, but ranges of from 29% or 30% to 42% can be equally advantageous. Because the contents of $SiO_2$ according to the invention occupy a relatively narrow band, the upper and lower limits mentioned can of course be combined with one another as desired.

The vitreous or at least partly crystalline sealing material according to the invention comprises $B_2O_3$ in a proportion of from 5% to <20%. This content ensures a process window of adequate size for the sealing-in operation of the sealing material. Low contents of boron are required so that the sealing material wets the substrate at high temperatures before it crystallises. However, the upper limit should not be exceeded, since otherwise the chemical resistance of the sealing material would be reduced. Furthermore, in sealing materials having high boron concentrations it may occur that boron vaporises off from the glass melt during production of the sealing material and/or during melting for the joining process and/or during operation of the component joined with the sealing material. It therefore cannot be ruled out that the material changes gradually over time and that volatile boron exerts an adverse influence on the operation e.g. of the fuel cell or electrolysis cell. Within the limits described the sealing material has a very good chemical resistance, which makes it also employable, for example, in high temperature electrolysis units (SOEC) or feedthroughs which are exposed in particular to harsh operating conditions or particular emergency conditions. Preferred contents of $B_2O_3$ are also from 5% to 18%.

A preferred embodiment of the sealing material according to the invention provides that $B_2O_3$ is present with a content of at least 7%. This lower limit applies with all the upper limits mentioned for $B_2O_3$, and of course also in any combination with the ranges disclosed for the remaining components. Thus, in particular, contents of $B_2O_3$ of from 7% to <20% or from 7% to 18% are preferred.

Small amounts of $Al_2O_3$ can be present in the sealing material according to the invention, namely of from 0% to 5%. Higher contents can lead to undesirably low values of the coefficient of thermal expansion and too greatly increase the viscosity of the sealing material. Preferably, even <2.1% is contained in the sealing material, advantageously even <2.0% or at most 1.7%. Contents beyond these values increasingly render possible the formation of aluminate or aluminosilicate phases, such as e.g. $MgAl_2O_4$ spinel, which because of their low coefficient of thermal expansion are not desirable for joining with the high-expansion alloys. The limits mentioned, in particular the preferred and/or advantageous values, therefore apply in any combination with other components mentioned in this description and the reported contents thereof.

One necessary component of the sealing material according to the invention is CaO, and in particular with a content of from 4% to 30%. It has been found that CaO-containing and BaO-free sealing materials do not have a tendency for formation of chromate phases. It is presumed that diffusion of chromate into the sealing materials according to the invention is suppressed. As a result of the fact that no phase conversion of the sealing material according to the invention therefore takes place, the curve of the thermal expansion (i.e. the graph of the thermal expansion values over temperature) also has no discontinuities and/or jumps, so that a particularly stable bonding of the sealing material to the surface of the component with which it is joined is achieved. A particularly advantageous minimum content of CaO is 5%.

The crystallisation properties of the sealing material can be controlled, given a suitable process procedure, in cooperation with the content of CaO. The range of from >15% to 30%, 15.5% to 30%, 16% to 30%, 17% to 30% or 19% to 30% is preferred for the CaO content, in particular for the at least partly crystallising embodiment of the sealing material. The proportion of $SiO_2$ present is in this context preferably from 25% to 45%.

In particular for the vitreous embodiment of the sealing material and/or the embodiment having a low proportion of crystalline parts, a lower content of CaO is preferred, in particular a content of from 4% to <15%. Particularly advantageously, the range can be from 4% to 14%, but also from 4% to 13% and/or from 4% to 12%. The proportion of $SiO_2$ present is in this context preferably from 25% to <35%.

However, CaO should not be dispensed with completely, since otherwise the tendency towards crystallisation would increase too greatly.

A further necessary component of the sealing material according to the invention is MgO with a content of from >30% to 40%. MgO contributes towards controlling the crystallisation properties of the joint material. A further positive effect is that the dielectric loss can be lowered by MgO-containing sealing materials. Furthermore, the melting temperature and the glass transition temperature can be reduced. The content of MgO furthermore has the effect of an increase in the coefficient of thermal expansion and therefore represents a simple possibility of adapting the sealing material to components with which it is to be joined. This effect is also based on the fact that the addition of MgO can cause the crystallisation of enstatite ($MgSiO_3$) and/or $Mg_2SiO_4$, which is known as a crystal phase of high thermal expansion ($\alpha_{(20-300)}$=8.9 to $11 \cdot 10^{-6}$ $K^{-1}$). MgO equally has the effect of lowering the glass transition temperature $T_g$. In interaction with CaO, the high-expansion crystal phases $CaMgSi_2O_6$ and/or $Ca_3MgSi_2O_8$ can be formed. Furthermore, the high MgO content increases the good chemical resistance of the joint material.

The inventors have found that it was possible to accelerate the kinetics of the crystallisation through the high MgO content without shifting the crystallisation onset to below the spherical point. For producing coatings and also joints, short process times are thus desirable for reducing the outlay on production. Furthermore, the metals and alloys used can degrade in their mechanical properties and also corrode chemically due to too long a holding time at high sealing-in temperatures. The sealing materials according to the invention can achieve joints with adequate crystallisation at processing temperatures of less than 1,000° C. and peak holding times of less than one hour.

Furthermore, the sealing material according to the invention comprises as optional tetravalent components $CeO_2$ and/or $TiO_2$ and/or $ZrO_2$ and/or $SnO_2$ and/or $HfO_2$ with in each case a content of up to 10%. These oxides can have the effect in particular of nucleating agents for the partial crystallisation or complete crystallisation desired in certain embodiments and cause an increase in the glass transition temperature $T_g$. The crystallisation temperature in particular can be controlled with these additions.

Further optional trivalent components are $La_2O_3$ and/or $Y_2O_3$ with a content of in each case up to 10%. Equally further trivalent optional components are oxides $R_2O_3$ selected from the group $Ga_2O_3$ and/or $In_2O_3$ and/or $Dy_2O_3$ and/or $Yb_2O_3$ with a content of up to 10%. Selected from the group means that the joint material according to the invention comprises the members of the group individually or together in any desired combination optionally and up to the upper limit mentioned. These components are also capable of influencing the crystallisation properties of the sealing material, in particular during production of the components comprising it. At the same time they can increase the glass formation temperature. Moreover, a combined action of the tetravalent and trivalent components can be utilised to control the crystallisation properties. For example, contents of $ZrO_2$ and $Y_2O_3$ during the crystallisation can lead to the formation of the high-expansion cubic $ZrO_2$ phase (yttrium-stabilised zirconium oxide).

Equally, the crystallisation properties of the sealing materials according to the invention can be controlled by the interaction of MgO and the trivalent components. In particular, the crystallisation can be accelerated so that the production outlay is reduced without precipitation of undesirable crystal phases occurring.

The coefficient of thermal expansion $\alpha_{(20\text{-}300)}$ of the sealing material according to the invention in the vitreous state is at least $6\cdot10^{-6}$ $K^{-1}$, advantageously at least $8\cdot10^{-6}$ $K^{-1}$ and advantageously up to $9.6\cdot10^{-6}$ $K^{-1}$ and particularly advantageously up to $10.0\cdot10^{-6}$ $K^{-1}$.

In the at least partly crystallised state the coefficient of thermal expansion $\alpha_{(20\text{-}300)}$ of the sealing material according to the invention in the temperature range of from 20° C. to 300° C. is at least $7\cdot10^{-6}$ $K^{-1}$, advantageously at least $7.5\cdot10^{-6}$ $K^{-1}$ and advantageously up to $9.8\cdot10^{-6}$ $K^{-1}$ and particularly advantageously up to $10.0\cdot10^{-6}$ $K^{-1}$. In the temperature range of from 20° C. to 700° C. the coefficient of thermal expansion $\alpha_{(20\text{-}700)}$ of the at least partly crystallised sealing material according to the invention is at least $9\cdot10^{-6}$ $K^{-1}$, advantageously at least $10.0\cdot10^{-6}$ $K^{-1}$ or at least $10.5\cdot10^{-6}$ $K^{-1}$ and advantageously up to $11.1\cdot10^{-6}$ $K^{-1}$.

These coefficients of thermal expansion $\alpha_{(20\text{-}700)}$ are greater for the at least partly crystallised sealing material than those known from the publications discussed above. This property renders it possible in an advantageous manner also to be able to readily process the sealing material according to the invention, as a result of which an integration into components and/or products is favoured. For this, the sealing material according to the invention is conventionally applied in the vitreous state, optionally after production of a preform, to a component and/or regions of a component and heated together with the component so that it softens, wets the surface of the component and forms a joint with this, generally a firm and positive joint. Due to the process procedure, in particular by the holding and/or establishing of temperature intervals, crystalline parts form in the sealing material, so that it is present in the at least partly crystallised state. As already described, a completely crystallised material is also possible. The at least partly crystallised sealing material has these increased coefficients of thermal expansion $\alpha_{(20\text{-}700)}$. The sealing material according to the invention is thus in a particularly advantageous manner a material which crystallises independently, i.e. due to the suitable temperature programme.

It is provided by and likewise included in the invention that the sealing material according to the invention can be free (apart from at most impurities) from $TeO_2$, inter alia because the raw material is a health hazard to the human body. This means that the sealing material according to the invention preferably comprises $TeO_2$ to the extent of less than 0.3% and particularly preferably to the extent of less than 0.2%. The invention of course includes the complete freedom from $TeO_2$.

All the ranges which are preferred and particularly preferred in this description apply likewise to the individual components mentioned and not only to the entirety of the particularly preferred and very particularly preferred ranges, any lower limit can be combined with any upper limit and vice versa. The same applies to the ranges described as advantageous.

Thus, a preferred variant of the at least partly crystallised sealing material according to the invention provides the following ranges for the components present: $SiO_2$ from 25% to 45%, $B_2O_3$ from 5% to 18%, $Al_2O_3$ from 0% to 5%, CaO from >15% to 30%, MgO from >30% to less than 40%, $La_2O_3$ from 0% to 10%, $Y_2O_3$ from 0% to 10%, $TiO_2$ from 0% to 10%, $ZrO_2$ from 0% to 10%, $SnO_2$ from 0% to 10%, $HfO_2$ from 0% to 10% und $R_2O_3$ from 0% to 10%.

An equally preferred variant of the vitreous or at least partly crystallised sealing material according to the invention provides the following ranges for the components present: $SiO_2$ from 25% to <35%, $B_2O_3$ from 5% to <20%, $Al_2O_3$ from 0% to 5%, CaO from 4% to <15%, MgO from >30% to 40%, $La_2O_3$ from 0% to 10%, $Y_2O_3$ from 0% to 10%, $TiO_2$ from 0% to 10%, $ZrO_2$ from 0% to 10%, $SnO_2$ from 0% to 10%, $HfO_2$ from 0% to 10% and $R_2O_3$ from 0% to 10%.

As already described, a particularly preferred range for the content of $Al_2O_3$ is 0% to <2.1%, in particular from 0% to <2%. Due to the low proportion of $Al_2O_3$ the formation of undesirable cordierite phases ($Mg_2Al_4Si_5O_{18}$) during the crystallisation can be prevented or at least significantly reduced. This crystal phase is undesirable because of its very low thermal expansion $\alpha_{(20\text{-}750)}$ in the range of from approx. $0\cdot10^{-6}$ to $2\cdot10^{-6}$ $K^{-1}$.

A particularly preferred range of ZnO is 0% to <5%. As likewise already described, these ranges can be combined with any ranges stated for the remaining components.

A preferred embodiment provides that the sealing material according to the invention necessarily comprises $Y_2O_3$, and indeed in a proportion of from >0% to 10%, advantageously 0.1% to 10%. This component has the effect of stabilising the glass network. The trivalent $Y^{3+}$ cation is attributed network-forming properties, which increase $T_g$. The upper limit of 10% should not be exceeded, since otherwise the flow of the sealing material is too severely impeded. $Y_2O_3$ can furthermore likewise have the effect of suppressing undesirable cordierite crystallisation, so that, as the inventors have found, a combination of low $Al_2O_3$ content and presence of $Y_2O_3$ can show particularly advantageous synergistic effects.

Advantageously, the sealing material according to the invention is low in the alkali metals or the oxides thereof $Li_2O$ and/or $Na_2O$ and/or $K_2O$. Particularly advantageously, the sealing material comprises less than 1 mol % in total of these alkali metal oxides mentioned. Very particularly advantageously, the sealing material according to the invention is free from these alkali metal oxides mentioned apart from at most traces. Generally, alkali metals are reputed to adversely influence the electrical insulation properties. The chemical resistance also decreases with an increasing content of alkali metals.

Advantageously, the contents of $SiO_2$ and MgO are selected such that the ratio $SiO_2$/MgO assumes values of from 0.6 to 1.4. Equally advantageously, the proportions of MgO and CaO are set such that the ratio MgO/CaO assumes values of from >1.1 to <10. In particular, these ratios apply at a minimum content of CaO of 5%. At low CaO contents a high MgO content is necessary in order to achieve the desired high coefficients of thermal expansion after the crystallisation. Accordingly, the ratio $SiO_2$/MgO must also be set such that the formation of silicate phases of high Mg content, such as e.g. forsterite and/or enstatite and/or monticellite, occurs.

Also advantageously, the sealing material according to the invention is low in the oxides $Cs_2O$ and/or $Rb_2O$ and/or $Fr_2O$. The joint material according to the invention therefore preferably comprises less than 5% of $Cs_2O$ and/or $Rb_2O$ in total. This wording also includes contents of the compositions mentioned of 0%.

Further additions are of course possible and likewise included in the invention. In the context of the invention the term sealing material includes both the amorphous base glass, which is employed e.g. before the joining operation, and the materials formed from the base glass during processing, which can be present inter alia in a vitreous, partly crystallised, crystallised or other form.

Particularly advantageously, the sealing material according to the invention is at least substantially free from PbO, i.e. it comprises PbO to the extent of at most 0.3%, and very particularly preferably the sealing material according to the invention is free (apart from at most traces) from PbO. The same applies to $Bi_2O_3$, which the sealing material comprises as an individual component likewise to the extent of at most 0.3% and preferably not at all.

Furthermore, the sealing material according to the invention can comprise impurities caused by raw materials or also by refining agents, such as, for example, $As_2O_3$ and/or $Sb_2O_3$ and/or SrCl, of in each case up to 0.2%.

In one alternative the sealing material according to the invention is present as an amorphous glass after processing, i.e. after joining to the surface of another component. This means that it has substantially no crystalline parts. In a further alternative the sealing material according to the invention is present in an at least partly crystallised form after the processing.

Whether the sealing material according to the invention is present as an amorphous glass or as an at least partly crystallised material can—in addition to the balancing of the components described—also be determined by the temperature programme during processing.

As a crystalline phase preferably $CaSiO_3$ (wollastonite) and/or $MgSiO_3$ (enstatite) and/or $Mg_2SiO_4$ (forsterite) and/or $CaMgSiO_4$ (monticellite) and/or $CaMgSi_2O_6$ (diopside) and/or $Ca_2MgSi_2O_7$ (akermanite) is formed in the sealing material according to the invention comprises and/or is formed from these.

The contents of $SiO_2$ and/or CaO described can prevent the so-called cristobalite jump, at which low cristobalite is converted into high cristobalite, from occurring in the thermal expansion curve.

Because the sealing material according to the invention is at least substantially free from BaO and SrO, $SrSi_2O_5$ and/or $SrSiO_3$ and/or $Sr_2SiO_4$ and/or $Sr_2Si_3O_8$ and/or $Sr_2MgSi_2O_7$ are likewise not formed as crystal phases. The same applies analogously to barium-containing crystal phases. A formation of tridymite can likewise be suppressed and/or even avoided by the contents of CaO according to the invention.

In the at least partly crystallised embodiment the composition of the sealing material according to the invention is preferably established such that it crystallises slowly. If it were already to undergo very strong crystallization, adequate wetting of the components to be joined is often not achieved.

The temperature at the start of sintering of a sealing material according to the invention in the vitreous state is advantageously at most 780° C. Particularly advantageously, it is at least 660° C. Advantageously, the temperature at the start of sintering is between 670° C. and 770° C. This corresponds approximately to the processing temperature. If the sealing material remains in the vitreous state, the processing temperature corresponds approximately to the maximum operating temperature to which a component can be exposed in the long term.

However, if an at least partial crystallisation of the sealing material is carried out during processing, the temperature which is decisive for long-term operation is the softening temperature of the at least partly crystallised sealing material. In the case of the sealing materials according to the invention in the at least partly crystallised state this is significantly higher than for the same composition in the vitreous state.

Due to this circumstance it is possible that the sealing material according to the invention is joined to components at lower temperatures, is at least partly crystallised by a suitable temperature programme and the resulting at least partly crystallised sealing material and therefore the component comprising this are then exposed to higher operating temperatures in the long term, in particular operating temperatures which are higher than the processing temperature. This protects the components in an advantageous manner during production, and also the production of some components is only rendered possible by this means. This property mentioned can be characterised in that although the sealing material has a $T_g$ which above the $T_g$ shows no relaxation by viscous flow in the dilatometric expansion curve and the dilatometric softening point is above the operating temperature. In the ideal case the sealing material has no $T_g$ at all and no longer has a dilatometric softening point in the temperature window observed.

The invention equally includes barrier layers which comprise the sealing material described. Barrier layers in general fulfil the function of preventing migration of substances. The invention includes in particular a barrier layer on a component made of metal or ceramic.

Depending on the ambient conditions, it is characteristic of bodies of metals that constituents, for example metal atoms or ions, can diffuse out of them and into the environment. In the environment they may exert a harmful influence. For example, contact of the human skin with chromium-nickel steels can lead to allergic reaction which can be caused inter alia by dissolving of constituents out of the steel and uptake thereof by the organism.

The problem is particularly striking in fuel cells, where the constituents diffusing out of the metals can attack the housing components and/or even damage the electrodes. Alloys of high chromium content are often employed as so-called interconnector materials for construction of high temperature fuel cells (SOFC). These interconnectors separate the gas compartments and ensure electrical contact between individual cells. Materials to be found in industrial production have compositions such as e.g. 95 wt. % of Cr, 5 wt. % of Fe and low contents of $Y_2O_3$ (CFY, Plansee) or also 70-78 wt. % of Fe, 20-24 wt. % of Cr, 1-3 wt. % of W, 0.2-1 wt. % of Nb, and low contents of further alloying constituents (Crofer® 22H, ThyssenKrupp).

The advantages of these materials compared with other alloys of lower chromium content lie in the high thermal conductivity, the high resistance to corrosion and a thermal expansion which is adapted to fully stabilised zirconium oxide, such as 10ScSZ ($ZrO_2$—10 mol % of $Sc_2O_3$) and 8YSZ ($ZrO_2$—8 mol % of $Y_2O_3$).

A disadvantage of such alloys is the high vaporisation of chromium at the high operating temperatures of the fuel cell, in the case of SOFC conventionally about 850° C. The vaporisation of chromium and the associated depositing of chromium-containing species on the cathode is a known degradation mechanism of the SOFC stack. These materials are therefore provided with protective layers. These protective layers can be spinel layers, LSM layers (lanthanum strontium manganate), $Al_2O_3$ layers, which are known to be useful for inhibiting vaporisation of chromium. An acknowledged method for applying these protective layers is e.g. APS (atmospheric plasma spraying). However, this method results in an involved and therefore expensive production process and requires an additional step in the process chain.

A further decisive disadvantage of the alloys of high chromium content is the reaction at the interface with the joint glass conventionally used, which is employed for joining the fuel cell stack, e.g. the SOFC stack. The chromium can react with glasses of high barium content and form barium chromate phases at the interfaces which are volatile at the operating temperature of the fuel cell. However, glasses of high barium content are joint glasses which are used the most for this use. As a result of this reaction, loosening of the glass-metal joint and an increased porosity occurs. The gas tightness of the cell therefore cannot be guaranteed over the life of the fuel cell, so that a reduced output or even failure of the fuel cell may result.

Furthermore, dissolving of the chromium and/or nickel in the joint material, in particular the sealing material, can also occur. Due to progressive diffusion of the chromium and the iron through the layer of the joint material in the fuel cell stack the resistance is reduced, which in extreme cases can lead to a short circuit of the cell. Moreover, a short circuit can be triggered by the formation of conductive metal oxides. Similar circumstances can arise with nickel.

The invention therefore provides for providing the metal components with the barrier layer according to the invention, which comprises the sealing material described above. In particular, the barrier layer is made of the sealing material described. The barrier layer according to the invention is in particular also capable of separating conventional joint glasses from the metal components e.g. of the SOFC, so that the metals, in particular chromium-containing steels and/or chromium-containing alloys, are separated from the conventional joint glasses by means of the barrier layer. The barrier layer thus preferably prevents the diffusion of chromium and/or chromium ions and/or chromium compounds and/or nickel and/or nickel ions and/or nickel compounds from the metal into the environment and/or it protects the metal against substances originating from the environment.

It is equally possible to apply the barrier layer comprising the sealing material according to the invention to components made of ceramic. Suitable ceramics are in particular ceramics of $Al_2O_3$ and/or stabilised zirconium oxide, wherein the stabilising is preferably effected by one or more oxides selected from the group of $Y_2O_3$, $Sc_2O_3$, CaO, MgO and/or $CeO_2$. The barrier layer here in principle fulfils the same function as described in the case of the metals. In particular, the barrier layer can prevent the diffusion of substances from the ceramic into the environment and/or it protects the ceramic against attack by substances originating from the environment.

For use as a barrier layer the sealing material according to the invention is advantageously fused with the metal and/or the ceramic in a substantially pore-free state. Fused means that at least the interface between the component and sealing material has been melted. However, it is not necessary for the entire layer of the sealing material to have to be melted. In a substantially pore-free state means that only in exceptional cases, due to unavoidable production inaccuracies or extreme operating states, the layer of sealing material contains pores. Freedom from pores prevents constituents of the metal component and/or the ceramic component, in particular metal atoms or ions, from being able to pass from the metal through the sealing material into the environment. The action of the barrier layer can be based in particular on the prevention of the diffusion of the metals, for example of metal atoms or ions. The barrier layer according to the invention is to be found on a layer of metal which is generally a component. The layer of metal can be of any desired thickness and any desired shape. Fusing of the barrier layer with the metal is carried out by the generally known processes. In principle, in this context the sealing material is brought into contact with the component or at least arranged close to this and then heated. The sealing material thus melts, and joins to the component. On cooling, the sealing material can in general remain amorphous, or as is advantageously provided, can at least partly crystallise.

Particularly advantageously, the sealing material in the barrier layer is only partly crystallised. This means that in the glass matrix obtained crystalline parts are embedded in an amorphous matrix. Crystallised glasses and/or ceramics can frequently and often unavoidably in the production process have pores. These and in particular also open pores, which can pass through the layer like a channel, enable constituents of the metal to enter into the environment through these pores. As a result of the sealing material of the barrier layer according to the invention advantageously being configured in a partly crystallised form and therefore having amorphous parts, the formation of pores is effectively prevented. The amorphous parts of the barrier layer according to the invention act, as it were, as a putty and seal for the crystalline parts. For example, the diffusion of Cr from Cr-containing steels is effectively prevented by the barrier layer described. The thickness of the barrier layer here can be, for example and advantageously, 10 µm to 300 µm.

The sealing material according to the invention is in general produced by melting the constituents into a glass in a conventional glass glass furnace known to the person skilled in the art and then grinding this to a glass powder. The glass powder can be applied e.g. in the form of a dispensable paste or a presintered shaped body.

As an advantageous use the sealing material according to the invention can be ground after its production and employed as a filler in other materials, but in particular in joint materials or glasses.

A particular advantage of the invention is that the sealing material does without additional nucleating agents and/or additions which effect the crystallisation of the sealing material. Rapid processing of the material is thus possible. Over a sintering at, for example, 780° C. for two hours, the sealing material crystallises partly and independently. The high and stable insulating properties, for example at the operating temperatures of a fuel cell, are a further advantage of the sealing materials.

Joint connections which comprise the sealing material according to the invention can be established with the at least partly crystallised sealing material according to the invention. Preferably, joint connections can thus be established between at least two metal components, in particular made of chromium-containing steels and/or chromium alloys and/or nickel alloys, in which the at least two metal components are joined with the sealing material according to the invention. Equally possible and preferable are joint connections between at least two ceramic components, in particular made of $Al_2O_3$ and/or stabilised zirconium oxide, wherein the stabilising is advantageously effected by one or more oxides selected from the group of $Y_2O_3$, $Sc_2O_3$, CaO, MgO and/or $CeO_2$, in which the at least two ceramic components are joined with the sealing material according to the invention. Furthermore possible and preferable are joint connections between at least one metal component and one ceramic component, in particular made of the materials in each case named above, in which the at least one metal component and the at least one ceramic component are joined with the sealing material according to the invention. Preferably, stacks are produced from the joint connections mentioned.

The principle of the joint connection described can also be used on the barrier layers according to the invention. The invention accordingly provides a layer system which comprises at least one element of metal and/or ceramic, wherein the metal in particular comprises chromium-containing steel and/or chromium-containing and/or nickel-containing alloys and the ceramic in particular comprises $Al_2O_3$-based ceramics and/or stabilised zirconium oxide, wherein the stabilising is preferably effected by one or more oxides selected from the group of $Y_2O_3$, $Sc_2O_3$, CaO, MgO and/or $CeO_2$. On the element made of metal and/or ceramic the sealing material according to the invention described is applied at least in regions, and on this at least in regions at least one further glass-based sealing material.

A layer system which has the layer sequence of element made of metal and/or ceramic, in particular comprising the abovementioned materials, followed by the sealing material according to the invention, followed by a further glass-based sealing material, followed by the sealing material according to the invention, followed by element of metal and/or ceramic, in particular comprising the abovementioned materials, can particularly preferably be constructed on the basis of this layer system. This layer sequence can be repeated as often as desired and in particular a stack, for example for a fuel cell, can be constructed this way.

The invention accordingly equally includes a fuel cell and/or an electrolysis cell which comprises the sealing material according to the invention or the barrier layer according to the invention or the layer system according to the invention.

On the basis of the positive properties disclosed herein for the material, in particular the electrical insulating properties and/or coefficients of thermal expansion thereof, a further advantageous use of the sealing material according to the invention is a feedthrough element, in particular an electrical feedthrough element. The invention therefore equally includes a feedthrough element comprising a metallic or ceramic carrier element, which has a feedthrough opening, and a functional element, which is held in the feedthrough opening by the sealing material according to the invention, preferably electrically insulated from the carrier element. In particular, it is possible for the feedthrough opening to be hermetically sealed with the sealing material. The functional element can be, in particular, an electrical conductor, but also holding devices for further elements and/or wave guides and/or optical signal transmission devices etc.

Alternatively, it is possible and equally preferable for a barrier layer according to the invention described above to be present within the feedthrough opening, separating at least one further glass-based sealing material from the material of the carrier element. This means in particular that the internal wall of the feedthrough opening can be provided with the barrier layer according to the invention at least in regions, and this barrier layer separates a further glass-based sealing material, which holds the functional element in the feedthrough opening as described above, from the material of the carrier element. As can be seen directly by the person skilled in the art, this teaching can also be applied to the functional element. This can be correspondingly provided with a barrier layer according to the invention which separates the material of the functional element from at least one further glass-based sealing material which holds the functional element in the feedthrough opening. Combinations in which in particular the barrier layer can be present on the internal wall of the feedthrough opening and the external wall of the functional element are of course also possible.

The materials described above in the case of the joint connection and/or the barrier layer and/or the layer system in particular can be employed in this manner for producing a feedthrough element. It is particularly advantageous if the sealing material is employed in partly crystallised form in the feedthrough element according to the invention. In particular, it is then possible for a so-called compression glass seal to form, in which the carrier element exerts a compressive stress on the material holding the functional element and/or the barrier layer.

One criterion for the usability of the sealing material is that the sealing material can be adapted in its thermal expansion in an optimum manner to the materials to be joined. Furthermore, no stresses which are too high may arise in the sealing material due to a change in the coefficient of thermal expansion due to the crystallisation process. The sealing material according to the invention ensures this inter alia by avoiding undesirable crystal phases.

On the basis of its physical properties, the sealing material according to the invention is particularly suitable for producing joint connections of high heat resistance and/or barrier layers of high heat resistance. In the context of the invention high heat resistance is understood as meaning a temperature range of in particular more than 600° C. It is particularly suitable for producing a gas-tight, highly heat-stable, electrically insulating joint connection or barrier layers of and/or on materials having a thermal expansion $\alpha_{(20-750)}$ of between $7 \cdot 10^{-6}$ $K^{-1}$ and $11 \cdot 10^{-6}$ $K^{-1}$. Such materials are, for example, high-expansion steels and/or alloys, such as CFY, or also oxide ceramics, in particular $ZrO_2$ and/or $Al_2O_3$.

Further fields of use are sensors in combustion units, for example for automobile uses, ships' engines, power stations, aircraft and/or in space technology. A preferred use is the use of the sealing material according to the invention for producing sensors and/or actuators e.g. in the exhaust tract and/or in the combustion chamber of energy production units, for example of motor vehicles with combustion engines, gas turbines, aircraft turbines, cogeneration plants etc. Electrical feedthroughs in particular in nuclear power stations, fusion power stations, thermal power stations, solar furnaces and/or chemical reactors etc. are equally possible. Components comprising the sealing material can be exposed in particular to harsh operating conditions, which can be e.g. high temperatures, aggressive media, high pressures etc., e.g. in exploration devices in underground uses and/or for extraction of raw materials.

The sealing material according to the invention can nevertheless also be used for producing sintered bodies of high heat resistance. Production processes for sintered bodies are adequately known. In these the starting material of the sealing material according to the invention is generally mixed together in powder form, mixed with an in general organic binder and pressed into the desired shape. Instead of the powder of the starting materials, an already fused material according to the invention can also be ground and mixed with the binder. The pressed joint material/binder body is then brought to the sintering temperature, during which the binder can burn out and the components can sinter together at the sintering temperature. The sintered body obtained in this way can then be brought into contact with the components to be joined and join these and/or be joined to these by a soldering operation. The same principle can also be used for producing barrier layers.

The use of sintered bodies during soldering or production of barrier layers has the advantage that the sintered body is a shaped component and can be brought into virtually any desired geometries. A shape which is often used, by way of example, is a hollow cylinder, which can be introduced together with an electrical contact pin into feedthrough openings of metal components in order to obtain, by soldering, a preferably hermetically tight glass/metal feedthrough or glass-ceramic/metal feedthrough with an electrically insulated contact pin. Such feedthroughs are employed in many electrical components and are known to the person skilled in the art.

A further preferred use of the sealing material according to the invention is production of sheetings which comprise the sealing material. Such sheetings can however, similarly to the sintered bodies described above, be largely flexible in configuration. Shapes can be cut out of them and used in an advantageous manner to join planar components to one another.

The invention is explained in more detail in the following with reference to the properties of joint materials according to the invention and drawings.

The composition of exemplary joint materials according to the invention and the physical properties thereof are summarised in Table 1. The proportions of the components are reported in mol %, based on oxide.

The vitreous, i.e. amorphous sealing materials can also be the starting material for the at least partly crystalline sealing materials. The crystallisation can be achieved in particular by a suitable process procedure during processing. These processes are well-known to the person skilled in the art. The abbreviations in Table 1 have the following meanings:

CTE (300° C.) corresponds to $\alpha_{(20-300)}$, linear coefficient of thermal expansion from 20° C. to 300° C.

CTE (750° C.) corresponds to $\alpha_{(20-750)}$, linear coefficient of thermal expansion from 20° C. to 750° C.

ΔCTE (300° C.) difference between CTE (300° C.) in the amorphous state and CTE (300° C.) in the at least partly crystallised state $T_g$ transformation temperature $T_x$, onset temperature of crystallisation onset $T_x$, peak peak crystallisation temperature Start sintering start of sintering Softening temp softening temperature Spherical temp spherical temperature Half sphere temp half sphere temperature Flowing temp flowing temperature Dilat. Softening dilatometric softening temperature To produce the examples, the starting material was first melted in a glass furnace. The in general pulverulent vitreous sealing material was then produced therefrom by a grinding process. In the present examples a powder having a particle size distribution with a D(50) of approx. 10 μm and a D(99) of <63 μm was provided from the molten sealing materials.

Thermal characterisation of the sealing material is then carried out by means of a heating microscope. To this end, a cylindrical test specimen is pressed from the joint material in powder form which is to be characterised, and is heated at 10 K per minute on a ceramic base plate. The changes in shape of the test specimen are observed, with the following characteristic points, to which certain viscosities can be assigned, generally occurring for a non-crystallising sample as the temperature rises. The spherical temperature can be determined in this manner.

All the examples show values of the spherical temperature significantly above 800° C. The components are produced with the sealing material according to the invention conventionally at the spherical temperature, so that the spherical temperature substantially corresponds to the processing temperature.

In the vitreous variant component joints with the sealing material according to the invention can be exposed in the long term to temperatures up to close to the joining temperature. When at least partly crystallised variants of the sealing materials according to the invention are employed, the crystallisation preferably takes place during the production operation. The at least partly crystallised sealing material then has a softening temperature which is increased compared with the non-crystallised sealing material and which in the case of complete crystallisation corresponds to the melting temperature of the main crystal phase. Due to this jump in temperature components joined with the glass-ceramic variant of the sealing materials according to the invention can be exposed to higher temperatures than are required during their production. Some components are thus only now producible. While completely amorphous sealing materials can be operated up to temperatures of a maximum of 50° C. below their $T_g$ because of their softening, the partly crystallised sealing materials have a difference of more than 180° C. between their $T_g$ and their dilatometric softening and/or the $T_g$ of the completely crystallised sealing materials is more than 800° C.

The values achieved for the thermal expansion $\alpha_{(20-750)}$ in the at least partly crystallised state is always greater than $11 \cdot 10^{-6}$ $K^{-1}$ and thus better adapted to, for example, high-expansion steels, alloys of high chromium content and oxide ceramics, in particular $ZrO_2$ and $Al_2O_3$. It is equally advantageous that in the at least partly crystallised state the coefficient of thermal expansion of the sealing material according to the invention is greater than in the amorphous state. This is a consequence of the crystal phases which form. Compared with other materials, in the at least partly crystallised state the value of $\alpha_{(20-750)}$ is increased once again, which, as described, assists the joining of the sealing materials according to the invention to the standard steels mentioned.

BRIEF DESCRIPTION OF THE DRAWINGS

The invention is explained further with the aid of the drawings. The figures show.

All the drawings are purely in schematic form, and the dimensions and proportions of the actual objects may deviate from those of the drawings.

DETAILED DESCRIPTION

Figure 1A:
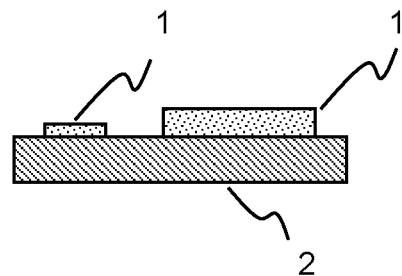
FIG. 1a: The barrier layer 1 on a component made of metal 2.

FIG. 1a shows a barrier layer of the vitreous or at least partly crystalline sealing material 1 according to the invention on a component of metal 2. As can be seen the barrier layer 1 can be on any desired regions of the surface of the component made of metal and in any desired thickness. This naturally equally includes a coating over the entire surface.

The barrier layer 1 is joined to the metal 2 by fusing the sealing material 1. A glass-metal join has formed. A joint system or also joint bond can also be referred to in the case of FIG. 1.

Figure 1B:
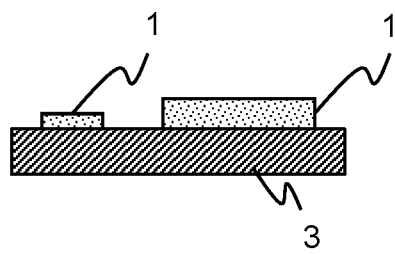
FIG. 1b: The barrier layer 1 on a component made of ceramic 3.

FIG. 1b shows a barrier layer of the vitreous or at least partly crystalline sealing material 1 according to the invention on a component made of ceramic 2. The same principles and information disclosed in the case of FIG. 1a are also applicable with respect to FIG. 1b.

Figure 2A:
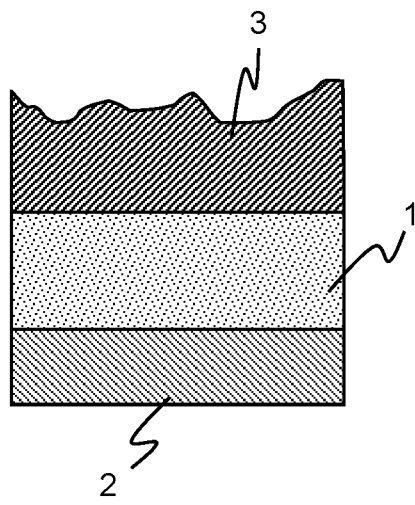
FIG. 2a: A joint connection with a component made of metal 2 and a component made of ceramic 3 joined with the sealing material 1.

FIG. 2a shows a joint connection with a component made of metal 2 and a component made of ceramic 3 joined with the sealing material 1. This joint bond shown represents as an example a base unit for producing any desired joined components. In particular, it is possible to join a component element 1 made of metal to a component element made of ceramic 2 with the vitreous or at least partly crystalline sealing material according to the invention. In particular, a hermetically tight joint is possible. As already described, it is of course also possible to join component elements made of metal, include different metals, or component elements made of ceramic, including different ceramics, to one another.

Figure 2B:
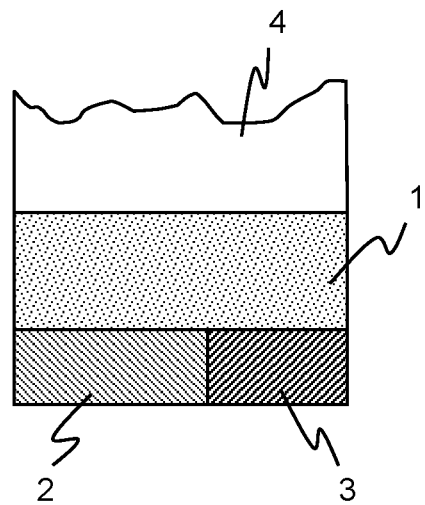
FIG. 2b: A composite system in the layer sequence component made of metal 1 and ceramic 3—layer of sealing material 1—further joint partner 4.

FIG. 2b shows a joint system in the layer sequence component made of metal 1 and ceramic 3—layer of vitreous or at least partly crystallised sealing material 1 according to the invention—further joint partner 4. In contrast to FIG. 2a, a hybrid component element comprising metal 2 and ceramic 3 is shown as a joint partner. The sealing material 1 according to the invention joins this to the further joint partner 4, which can comprise any desired suitable material. For example, the joint partner 4 can be a further glass-based sealing material, so that the layer of sealing material 1 can fulfil the function of a barrier layer, but also generally can act as a bonding promoter between the materials 2 and/or 3. As is known to the person skilled in the art, the joining strength and/or other properties of the joint of a sealing material with another material can depend on surface effects of the materials, in particular on chemical bridging bonds or adhesive forces at the interface. Consequently, it may be that a material is not optimal and/or is even incompatible with respect to the surface effects. The properties of the individual joint partners can be matched to one another by suitable layer sequences. The invention therefore also provides the provision of such layer sequences. As can be seen from the principle of 2b, this likewise represents a base unit for producing any desired components in which the sequence of the elements and/or layers shown can also recur in a modified form.

Figure 3A:
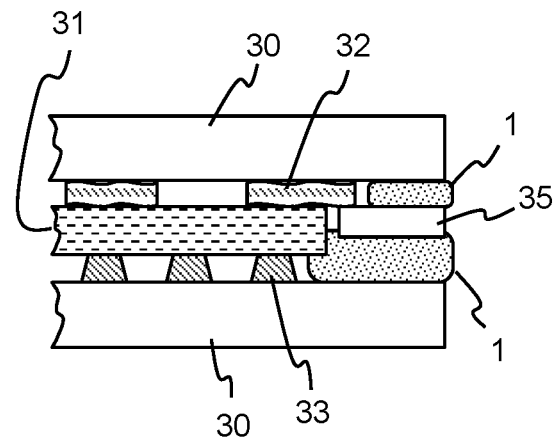
FIG. 3a: The recurring unit of a fuel cell
Figure 3B:
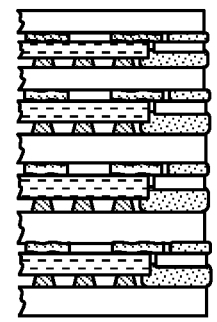
FIG. 3b: A fuel cell stack

A use example of such joint connections and/or layer sequences is shown in FIG. 3a and/or FIG. 3b. FIG. 3a shows purely in schematic form the recurring unit of a fuel cell. The electrode 31 is held between the interconnectors 30. The electrically insulated joining of the interconnectors 30 is effected via the cell frame 35. The cell frame 35 and the interconnectors are joined to one another by means of the vitreous or at least partly crystallised sealing material 1 according to the invention. Contacting of the electrode is effected via the electrode contacting elements 32, 33, which represent the anode or cathode contacting elements.

Essential criteria in selecting the material are, as described, in addition to the coefficients of thermal expansion, which must be matched to the materials of the interconnectors and/or cell frame, the heat resistance, in particular the ability to soften, but also the compatibility with the materials of the interconnectors and/or cell frame and/or operating substances, which may weaken and/or damage the sealing materials 1 by migration of material constituents.

The use of the sealing material 1 according to the invention renders possible, as already described, the use of standard materials for e.g. the interconnectors 30 and/or cell frame 35.

FIG. 3b shows a fuel cell stack constructed by means of the recurring unit according to FIG. 3a. This can be extended or shortened as desired.

Figure 4A:
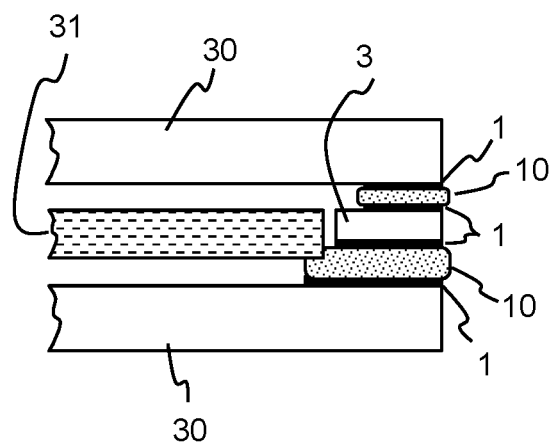
FIG. 4a: The recurring unit of an alternative fuel cell

FIG. 4a shows an alternative recurring unit of a fuel cell. Representation of the electrode contacting elements 32, 33 has been omitted for clarity. In actually existing objects they are of course present. In contrast to the recurring unit according to FIG. 3a, the vitreous or at least partly crystallised sealing material according to the invention is provided here as a barrier layer 1 which separates a joint material 10, which joins the interconnectors 30 and/or the cell frame 35 to one another, from the materials thereof. In particular, the further joint material 10 can be a glass-based sealing material. As already described, it is possible in this manner to be able to produce the interconnectors 30 and/or the cell frame 35 from the standard materials described, and also for the joint material 10 to be e.g. a standard glass, the diffusion of harmful constituents from the interconnectors 30 and/or the cell frame 35 into the standard joint material 10 being prevented or at least suppressed by the sealing material 10 according to the invention.

Figure 4B:
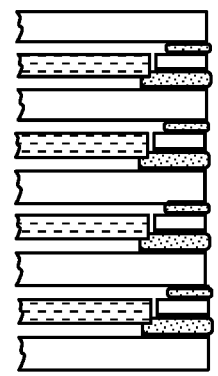
FIG. 4b: An alternative fuel cell stack

FIG. 4b shows in turn a fuel cell stack constructed by means of the recurring unit according to FIG. 4a. This can also be extended or shortened as desired.

Figure 5A:
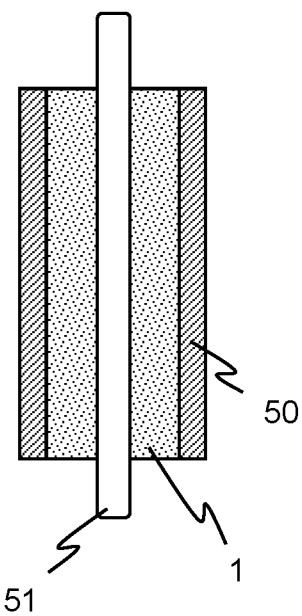
FIG. 5a: A section through a feedthrough element

FIG. 5a shows the section through a feedthrough element according to the invention. Feedthrough elements are known in general from the field of the art and are contained in many devices. Generally, such feedthrough elements conventionally comprise a functional element 51, e.g. an electrical conductor, which is fixed by an electrically insulating material 1, here the vitreous or at least partly crystallised sealing material 1 according to the invention, in a feedthrough opening of a carrier element 50. The parameters which distinguish the performance of such feedthrough elements are essentially the electrical resistance of the insulating material 1 and the resistance towards heat and pressure, which tend to cause the insulating material 1 and/or the functional element 51 to tear out of the feedthrough opening of the carrier element 50. The carrier element can be made of metal and/or ceramic or at least comprise these, in particular in regions which are provided with the sealing material 1.

Figure 5B:
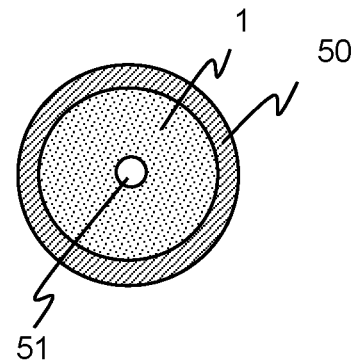
FIG. 5b: A feedthrough element in plan view

FIG. 5b shows the plan view of a feedthrough element according to FIG. 5a. As can be seen, the functional element 51 is arranged in particular concentrically in the circular feedthrough opening. Other geometric arrangements are nevertheless possible and included in the invention. The sealing material 1 holds the functional element 51 in the feedthrough opening and seals this off, in particular hermetically tightly.

The functional element 51 can generally perform various functions in a feedthrough element according to the present invention. The functional element 51 is most often an electrical conductor. In this case the functional element can be a filled or hollow pin or a tube. Such a pin can be produced from metal or other suitable conductors. In the context of the present invention the functional element 51 can also fulfil other functions, e.g. it can be a wave guide for e.g. microwaves or sound waves which are to be conducted through the feedthrough element. In these cases the functional element can usually be a tube, which is preferably produced from metal or ceramic. The functional element 51 can also be used to conduct a cooling fluid, such as cooling water or cooling gases, through the feedthrough element. A further possible embodiment of the functional element 51 is simply a holding element which holds further functional elements, e.g. thermocouples or fibres, such as optical wave guides. In other words, in this embodiment the functional element 51 can function as an adapter for functional elements which cannot be fixed directly in the electrically insulating glass or glass-ceramic material. In these cases the most suitable functional element is a hollow element or a tube.

Not only the geometric shape, such as the thickness of the sealing material 1 in the feedthrough opening, but also the joint strength of the sealing material 1 in the feedthrough opening, defines the maximum pressure to which the feedthrough element according to the invention could be exposed. When such a material is used in order to seal off a feedthrough opening, chemical and physical joint phenomena exist in the contact region of the sealing material 1 and the internal wall of the feedthrough opening or the external surface of the functional element 51. These joint phenomena can be chemical reactions or physical interactions between on the one hand the material of the internal wall of the feedthrough opening and therefore the material of the carrier element 50 and/or of the functional element 51 and on the other hand the components of the sealing material 1. If the composition of the sealing material 1 is selected in a suitable manner, these joint phenomena contribute significantly to the connecting strength between the fixing material and the materials to be fixed.

Figure 6A:
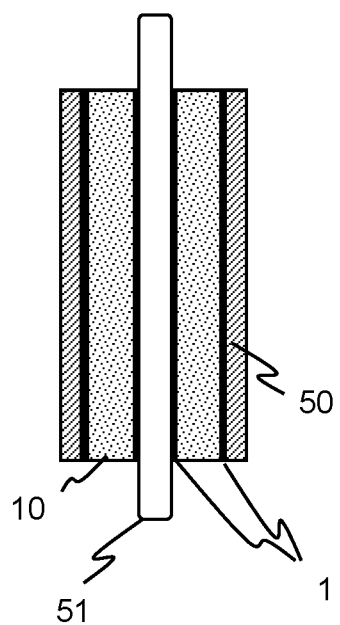
FIG. 6a: An alternative feedthrough element in cross section
Figure 6B:
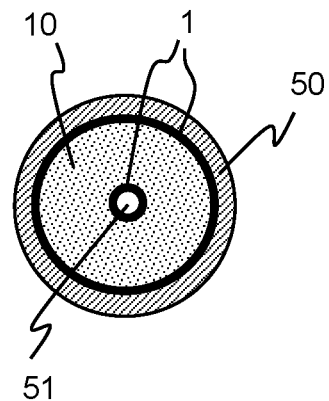
FIG. 6b: An alternative feedthrough element in plan view

FIGS. 6a and 6b show an alternative feedthrough device. This substantially corresponds to that shown in FIGS. 5a and 5b, so that for explanation of the corresponding elements reference is made to the statements made in the case of FIGS. 5a and 5b. In contrast to the embodiment of a feedthrough device described above, the vitreous or at least partly crystallised sealing material 1 according to the invention in this case is present as an intermediate layer to a further fixing material 10, that is to say forms a barrier layer 1 on the internal wall of the feedthrough opening of the carrier element 50 and/or the external wall of the functional element 51. The function of the barrier layer is therefore the same as or at least similar to that described in the case of FIGS. 4a and 4b and for this reason reference it made at this point to the corresponding statements regarding FIGS. 4a and 4b.

The advantages of the invention have been acknowledged in detail in the description. In particular, due to omission of BaO and SrO the sealing material 1 according to the invention renders possible a sealing joint with materials of high chromium content since it is chemically compatible with these. The sealing material 1 according to the invention is self-crystallising and crystallises in a shortened time interval, and it therefore can be employed efficiently and with a lower outlay on production in production processes for components which comprise the sealing material 1 according to the invention. Due to its improved coefficient of thermal expansion, it is possible to employ standard materials known for the uses, in particular steels. The sealing material according to the invention adheres very well to the materials in question and in this way renders possible the production of a joint which is stable in the long term. The sealing material 1 according to the invention moreover has a very good chemical resistance to attack by acid, alkali and water, so that the components produced with the sealing material 1 according to the invention can be employed in chemically aggressive environments.

With the sealing material according to the invention the inventors have succeeded in meeting the following criteria which are decisive for the use: The sealing-in temperature is less than 1,000° C., operating temperatures of up to 1,000° C. are rendered possible, a short half-life at the sealing-in temperature is required for the crystallisation (advantageously less than one hour, particularly advantageously less than 0.5 hour, the sealing material thus behaving similarly to conventional amorphous solder glasses during processing), the sealing material shows a very good wetting and adhesion on steels and chromium and nickel alloys, and also a very good chemical compatibility with the metals and a very good stability to hydrolysis and acid, the sealing material has very good electrical insulation properties, which manifests itself in a very high ohmic resistance even at high temperatures, and the at least partly crystallised sealing material has a very high mechanical strength.

TABLE 1

| Example No. | | 1 | 2 | 3 | 4 | 5 |
|---|---|---|---|---|---|---|
| Glass composition [mol %] | $SiO_2$ | 34.0 | 32.0 | 30.0 | 31.1 | 32.5 |
| | $B_2O_3$ | 8.0 | 8.0 | 7.0 | 7.5 | 8.5 |
| | $Al_2O_3$ | 1.5 | 1.5 | 1.5 | 1.5 | 1.5 |
| | $Y_2O_3$ | 4.5 | 4.5 | 4.5 | 4.1 | — |
| | $La_2O_3$ | — | — | — | — | — |
| | $CeO_2$ | — | — | — | — | — |
| | MgO | 32.0 | 33.0 | 34.0 | 32.0 | 35.0 |
| | CaO | 20.0 | 21.0 | 23.0 | 23.9 | 22.5 |
| | $ZrO_2$ | — | — | — | — | — |
| | Sum | 100 | 100 | 100 | 100 | 100 |
| $SiO_2$/MgO | | 1.06 | 0.97 | 0.88 | 0.97 | 0.93 |
| MgO/CaO | | 1.60 | 1.57 | 1.48 | 1.34 | 1.56 |
| $SiO_2$/(MgO + CaO) | | 0.65 | 0.59 | 0.53 | 0.56 | 0.57 |
| Bulk | CTE(300° C.) [ppm/K] | 8.49 | 8.81 | 9.15 | 9.13 | 8.71 |
| | $T_g$ [° C.] | 687 | 696 | 706 | 697 | 663 |

TABLE 1-continued

| | | | | | | |
|---|---|---|---|---|---|---|
| Properties powder | $T_g$ [° C.] | 707 | 717 | 725 | 726 | 682 |
| | $T_x$,onset [° C.] | 907 | 906 | 894 | 886 | 848 |
| | $T_x$,peak [° C.] | 938 | 931 | 916 | 912 | 872 |
| | Start sintering [° C.] | 740 | 744 | tbd | tbd | 674 |
| | Softening temp. [° C.] | — | 784 | tbd | tbd | 770 |
| | Spherical temp. [° C.] | 885 | 879 | tbd | tbd | 810 |
| | Half sphere temp. [° C.] | 1157 | 1139 | tbd | tbd | 1144 |
| | Flowing temp. [° C.] | 1168 | 1166 | tbd | tbd | 1168 |
| Crystallised | CTE(300° C.) [ppm/K] | 9.22 | 9.42 | 9.76 | 9.58 | 9.2 |
| | CTE(750° C.) [ppm/K] | >$T_g$ | >$T_g$ | 11.03 | 10.82 | 10.75 |
| | ΔCTE(300° C.) [ppm/K] | 0.73 | 0.61 | 0.61 | 0.45 | 0.49 |
| | $T_g$ [° C.] | 615 | 604 | | >800 | low |
| | Dilat. softening [° C.] | >800 | >800 | >800 | >800 | >800 |

| | Example No. | 6 | 7 | 8 | 9 | 10 |
|---|---|---|---|---|---|---|
| Glass composition [mol %] | $SiO_2$ | 31.0 | 31.1 | 31.5 | 30.0 | 31.0 |
| | $B_2O_3$ | 8.0 | 7.5 | 8.5 | 18.0 | 7.0 |
| | $Al_2O_3$ | 1.5 | 1.5 | 1.5 | 1.5 | 1.5 |
| | $Y_2O_3$ | 3.5 | 4.1 | — | 3.5 | 4.5 |
| | $La_2O_3$ | — | — | — | — | — |
| | $CeO_2$ | — | — | — | — | — |
| | MgO | 34.0 | 32.0 | 34.0 | 35.0 | 34.0 |
| | CaO | 22.0 | 23.9 | 21.5 | 10.0 | 22.0 |
| | $ZrO_2$ | — | — | 3.0 | 2.0 | — |
| | Sum | 100 | 100 | 100 | 100 | 100 |
| $SiO_2$/MgO | | | 0.97 | 0.93 | 0.86 | 0.91 |
| MgO/CaO | | | 1.34 | 1.58 | 3.50 | 1.55 |
| $SiO_2$/(MgO + CaO) | | | 0.56 | 0.57 | 0.67 | 0.55 |
| Bulk | CTE(300° C.) [ppm/K] | 8.93 | 9.02 | 9.51 | 7.15 | 9.01 |
| | $T_g$ [° C.] | 682 | 690 | 616 | 659 | 703 |
| Properties powder | $T_g$ [° C.] | 705 | 717 | 694 | 679 | 724 |
| | $T_x$, onset [° C.] | 885 | 896 | 867 | 876 | 891 |
| | $T_x$, peak [° C.] | 937 | 939 | 893 | 912 | 912 |
| | Start sintering [° C.] | tbd | 731 | 684 | 711 | 729 |
| | Softening temp.[° C.] | tbd | 812 | 778 | 777 | 829 |
| | Spherical temp. [° C.] | tbd | 860 | 821 | 852 | 878 |
| | Half sphere temp. [° C.] | tbd | 1130 | 1126 | 1043 | 1163 |
| | Flowing temp. [° C.] | tbd | 1153 | 1147 | 1057 | 1194 |
| Crystallised | CTE(300° C.) [ppm/K] | 9.48 | 9.58 | 9.18 | 7.94 | 9.74 |
| | CTE(750° C.) [ppm/K] | — | 10.83 | 10.42 | >$T_g$ | 11.00 |
| | ΔCTE(300° C.) [ppm/K] | 0.55 | 0.56 | −0.33 | 0.79 | 0.73 |
| | Tg [° C.] | low | >800 | >900 | 661 | >800 |
| | Dilat. softening [° C.] | >800 | >800 | >1000 | >850 | >800 |

| | Example No. | 11 | 12 | 13 | 14 | 15 |
|---|---|---|---|---|---|---|
| Glass composition [mol %] | $SiO_2$ | 38.7 | 40.0 | 36.0 | 36.0 | 32.0 |
| | $B_2O_3$ | 8.9 | 9.0 | 8.0 | 8.0 | 15.0 |
| | $Al_2O_3$ | 1.6 | 1.5 | 1.5 | 1.5 | 3.0 |
| | $Y_2O_3$ | 3.4 | 4.5 | 4.5 | 4.5 | — |
| | $La_2O_3$ | — | — | — | — | — |
| | $CeO_2$ | — | — | — | — | — |
| | MgO | 39.1 | 39.0 | 36.0 | 36.0 | 35.0 |
| | CaO | 4.3 | 6.0 | 14.0 | 14.0 | 13.0 |
| | $ZrO_2$ | 4.0 | — | — | — | 2.0 |
| | Sum | 100 | 100 | 100 | 100 | 100 |
| $SiO_2$/MgO | | 0.99 | 1.03 | 1.00 | 1.00 | 0.91 |
| MgO/CaO | | 9.00 | 6.50 | 2.57 | 2.57 | 2.69 |
| $SiO_2$/(MgO + CaO) | | 0.89 | 0.89 | 0.72 | 0.72 | 0.67 |
| Bulk | CTE(300° C.) [ppm/K] | 6.56 | 6.88 | 7.98 | 7.98 | 7.03 |
| | $T_g$ [° C.] | 685 | 687 | 690 | 690 | 645 |
| Properties powder | $T_g$ [° C.] | 713 | 715 | 705 | 705 | 669 |
| | $T_x$, onset [° C.] | 895 | 879 | 889 | 889 | 852 |
| | $T_x$, peak [° C.] | 917 | 902 | 915 | 915 | 884 |
| | Start sintering [° C.] | 762 | 761 | 748 | 748 | 725 |
| | Softening temp. [° C.] | 802 | 870 | 797 | 797 | 815 |
| | Spherical temp. [° C.] | 1042 | 910 | 893 | 893 | 851 |
| | Half sphere temp. [° C.] | n.d. | n.d. | 1160 | 1160 | 1076 |
| | Flowing temp. [° C.] | n.d. | n.d. | 1174 | 1174 | 1087 |
| Crystallised | CTE(300° C.) [ppm/K] | 8.81 | 8.95 | 8.97 | 8.97 | 7.8 |
| | CTE(750° C.) [ppm/K] | >$T_g$ | >$T_g$ | >$T_g$ | >$T_g$ | >$T_g$ |
| | ΔCTE(300° C.) [ppm/K] | 2.25 | 2.07 | 0.99 | 0.99 | 0.77 |
| | $T_g$ ° C. | 622 | 626 | 630 | 630 | 635 |
| | Dilat. softening [° C.] | >900 | >900 | >900 | >900 | >800 |

What is claimed is:

1. A vitreous or at least partly crystallised sealing material, comprising:
a composition comprising (in mol %, based on oxide):

| | |
|---|---|
| $SiO_2$ | 25-45; |
| $B_2O_3$ | 5-less than 20; |
| $Al_2O_3$ | 0-5; |
| CaO | 4-30; |
| MgO | greater than 30-40; |
| $CeO_2$ | 0-10; |
| $La_2O_3$ | 0-10; |
| $Y_2O_3$ | 0-10; |
| $TiO_2$ | 0-10; |
| $ZrO_2$ | 0-10; |
| $SnO_2$ | 0-10; |
| $HfO_2$ | 0-10; and |
| $R_2O_3$ | 0-10, | wherein $R_2O_3$ is an oxide selected, individually or in any desired combination, from a group consisting of $Ga_2O_3$, $In_2O_3$, $Dy_2O_3$, $Yb_2O_3$, and any combinations thereof, and
wherein the composition is free from BaO and SrO apart from at most impurities.

2. The sealing material of claim 1, further comprising a coefficient of thermal expansion in the at least partly crystallised state of $\alpha_{(20-700)} \geq 10.0 \cdot 10^{-6}$ $K^{-1}$.

3. The sealing material of claim 1, wherein the composition comprises (in mol %, based on oxide):

| | |
|---|---|
| $SiO_2$ | 25-45; |
| $B_2O_3$ | 5-18; |
| $Al_2O_3$ | 0-5; |
| CaO | greater than 15-30; |
| MgO | greater than 30-40; |
| $CeO_2$ | 0-10; |
| $La_2O_3$ | 0-10; |
| $Y_2O_3$ | 0-10; |
| $TiO_2$ | 0-10; |
| $ZrO_2$ | 0-10; |
| $SnO_2$ | 0-10; |
| $HfO_2$ | 0-10; and |
| $R_2O_3$ | 0-10. |

4. The sealing material of claim 1, wherein the composition comprises (in mol %, based on oxide):

| | |
|---|---|
| $SiO_2$ | 25-less than 35; |
| $B_2O_3$ | 5-less than 20; |
| $Al_2O_3$ | 0-5; |
| CaO | 4-less than 15; |
| MgO | greater than 30-40; |
| $CeO_2$ | 0-10; |
| $La_2O_3$ | 0-10; |
| $Y_2O_3$ | 0-10; |
| $TiO_2$ | 0-10; |
| $ZrO_2$ | 0-10; |
| $SnO_2$ | 0-10; |
| $HfO_2$ | 0-10; and |
| $R_2O_3$ | 0-10. |

5. The sealing material of claim 1, wherein the composition has a lower limit of $B_2O_3$ that is 7% (in mol %, based on oxide).

6. The sealing material of claim 1, wherein the composition comprises (in mol %, based on oxide), individually or in any combination,

| | |
|---|---|
| $Al_2O_3$ | 0-less than 2.1; |
| ZnO | 0-less than 5; and |
| $Y_2O_3$ | greater than 0-10. |

7. The sealing material of claim 1, wherein the crystalline phase in the at least partly crystallised state comprises at least one compound selected from a group consisting of $CaSiO_3$ (wollastonite), $MgSiO_3$ (enstatite), $Mg_2SiO_4$ (forsterite), $CaMgSiO_4$ (monticellite), $CaMgSi_2O_6$ (diopside), $Ca_2MgSi_2O_7$ (akermanite), and any combinations thereof.

8. The sealing material of claim 1, further comprising up to 30 wt. % of inorganic fillers selected from a group consisting of $Al_2O_3$, stabilised $ZrO_2$, MgO, $MgSiO_3$ (enstatite), $Mg_2SiO_4$ (forsterite), $CaMgSiO_4$ (monticellite), $CaMgSi_2O_6$ (diopside), $Ca_2MgSi_2O_7$ (akermanite), and any combinations thereof.

9. The sealing material of claim 1, wherein the sealing material is configured for a use selected from the group consisting of a fuel cell, an electrolysis cell, a feedthrough element, a sensor, an actuator, production of sintered bodies, production of sheetings, an additive material glass, an additive material in glass-ceramics, and any combinations thereof.

10. A composition comprising:
a component made of metal or ceramic, wherein the metal comprises chromium-containing steel and/or chromium-containing alloy and the ceramic comprises $Al_2O_3$ and/or stabilised zirconium oxide, wherein the stabilising is effected by one or more oxides selected from a group consisting of $Y_2O_3$, $Sc_2O_3$, CaO, MgO and/or $CeO_2$; and
a barrier layer on the component, wherein the barrier layer comprises the sealing layer of claim 1.

11. A joint connection, comprising:
a first component;
a second component; and
the sealing material of claim 1 joining the first and second components, wherein the first and second components are selected from a group consisting of a metal component and a ceramic component, the metal component comprising chromium-containing steels and/or chromium alloys and/or nickel alloys, the ceramic component comprising $Al_2O_3$ and/or stabilised zirconium oxide, wherein the stabilising is effected by one or more oxides selected from a group consisting of $Y_2O_3$, $Sc_2O_3$, CaO, MgO and/or $CeO_2$.

12. A layer system, comprising:
a first element;
a second element;
the sealing material of claim 1 between the first and second elements; and
at least one further glass-based sealing material applied to the sealing material at least in regions,
wherein the first and second elements are selected from a group consisting of a metal element and a ceramic element,
wherein the metal element comprises chromium-containing steel and/or chromium-containing alloys and/or nickel-containing alloys and the ceramic element comprises $Al_2O_3$-based ceramics and/or stabilised zirconium oxide.

13. The layer system of claim 12, comprising a layer sequence having the metal and/or ceramic element, followed by the sealing material, followed by the further glass-based sealing material, followed by the sealing material, followed by the metal and/or ceramic element.

14. The sealing material of claim 1, further comprising a ratio of $SiO_2/MgO$ from 0.6 to 1.4.

15. The sealing material of claim 1, further comprising a ratio of $MgO/CaO$ of from greater than 1.1 to less than 10.

16. The sealing material of claim 1, wherein the composition comprises more than 31.1 of MgO (in mol %, based on oxide).

* * * * *